US010511361B2

(12) United States Patent
Chang et al.

(10) Patent No.: US 10,511,361 B2
(45) Date of Patent: Dec. 17, 2019

(54) METHOD FOR DETERMINING A PRECODING MATRIX AND PRECODING MODULE

(71) Applicant: Intel Corporation, Santa Clara, CA (US)

(72) Inventors: Wenting Chang, Beijing (CN); Guangjie Li, Beijing (CN); Yujun Chen, Beijing (CN); Xu Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 15/571,348

(22) PCT Filed: Jun. 17, 2015

(86) PCT No.: PCT/CN2015/081679
§ 371 (c)(1),
(2) Date: Nov. 2, 2017

(87) PCT Pub. No.: WO2016/201647
PCT Pub. Date: Dec. 22, 2016

(65) Prior Publication Data
US 2019/0089427 A1    Mar. 21, 2019

(51) Int. Cl.
*H04B 7/0456*   (2017.01)
*H04B 7/0452*   (2017.01)
*H04B 7/06*     (2006.01)

(52) U.S. Cl.
CPC ......... *H04B 7/0456* (2013.01); *H04B 7/0452* (2013.01); *H04B 7/0617* (2013.01)

(58) Field of Classification Search
CPC ... H04B 7/0456; H04B 7/0617; H04B 7/0452
See application file for complete search history.

(56) References Cited

U.S. PATENT DOCUMENTS

| 8,325,852 B2* | 12/2012 | Zhang | H04B 7/0456 |
| | | | 375/296 |
| 8,503,567 B2 | 8/2013 | Kim et al. | |
| 9,716,604 B2 | 7/2017 | Pan | |
| 2008/0159425 A1* | 7/2008 | Khojastepour | H04B 7/0417 |
| | | | 375/260 |
| 2008/0303701 A1* | 12/2008 | Zhang | H04B 7/0456 |
| | | | 341/106 |

(Continued)

FOREIGN PATENT DOCUMENTS

CN    102164027 A    8/2011

OTHER PUBLICATIONS

International Search Report dated Mar. 10, 2016 for International Application PCT/CN2015/081679.

*Primary Examiner* — Will W Lin
(74) *Attorney, Agent, or Firm* — Eschweiler & Potashnik, LLC

(57) ABSTRACT

A method for determining a precoding matrix for a MIMO transmitter based on a weighted MMSE algorithm is disclosed. A precoding module identically transforms a first matrix expression into a second matrix expression. The first matrix expression comprises a matrix inversion operation of a quadratic matrix having a rank equal to a number of antennas of the MIMO transmitter. The second matrix expression comprises a matrix inversion operation of a quadratic matrix having a rank equal to a number of receivers scheduled for the MIMO transmitter.

19 Claims, 9 Drawing Sheets

(56) References Cited

U.S. PATENT DOCUMENTS

| | | | | |
|---|---|---|---|---|
| 2009/0285325 A1* | 11/2009 | Zhou | H04B 7/0854 | 375/267 |
| 2010/0232729 A1* | 9/2010 | Peleg | G06T 11/60 | 382/298 |
| 2011/0238424 A1* | 9/2011 | Keiler | G10L 19/038 | 704/500 |
| 2012/0099540 A1* | 4/2012 | Doppler | H04J 11/0033 | 370/329 |
| 2013/0202059 A1* | 8/2013 | Kim | H04L 25/0391 | 375/295 |
| 2013/0208825 A1* | 8/2013 | Kim | H04L 25/0391 | 375/295 |
| 2013/0250764 A1* | 9/2013 | Vasudevan | H04W 16/14 | 370/235 |
| 2013/0259156 A1* | 10/2013 | Baligh | H04L 25/03949 | 375/296 |
| 2013/0301746 A1* | 11/2013 | Mobasher | H04B 7/0456 | 375/267 |
| 2013/0343303 A1* | 12/2013 | Kim | H04B 7/0452 | 370/329 |
| 2014/0316698 A1* | 10/2014 | Roumeliotis | G01C 21/165 | 701/500 |
| 2015/0078490 A1* | 3/2015 | Hu | H04L 1/0054 | 375/341 |
| 2015/0124897 A1* | 5/2015 | Phan Huy | H04L 5/0023 | 375/267 |
| 2015/0131751 A1* | 5/2015 | Bayesteh | H04B 7/0413 | 375/267 |
| 2015/0188733 A1* | 7/2015 | Oh | H04L 25/0391 | 375/267 |
| 2015/0326295 A1 | 11/2015 | Kwon et al. | | |
| 2015/0358104 A1* | 12/2015 | Ohwatari | H04B 7/0456 | 370/252 |
| 2018/0234136 A1* | 8/2018 | Marinier | H04B 7/024 | |

* cited by examiner

Cell Average Spectral Efficiency for an antenna array with 64 antennas

| | MRT | ZF | SLNR | Weighted MMSE |
|---|---|---|---|---|
| 2 UE scheduled | 0% (bench mark) | 33.6% | 33.6% | 33.5% |
| Full scheduled (All UEs are scheduled) | 0% | 35.8% | 101% | 154% |

Table 1

Cell Average Spectral Efficiency for an antenna array with 16 antennas

| | MRT | ZF | SLNR | Weighted MMSE |
|---|---|---|---|---|
| 2 UE scheduled | 0% | 46.8% | 47% | 47.4% |
| 10 UE scheduled | 0% | 13.2% | 95% | 148% |

Table 2

Fig. 5

$$(A + UCV)^{-1} = A^{-1} - A^{-1}U(C^{-1} + VA^{-1}U)^{-1}VA^{-1}$$

with

| | |
|---|---|
| A | n-by-n matrix |
| U | n-by-k matrix |
| C | k-by-k matrix |
| V | k-by-n matrix |

Fig. 6

Computation Complexity for an antenna array with 64 antennas

|  | $N_d = 10$ | $N_d = 15$ | $N_d = 20$ |
|---|---|---|---|
| $\dfrac{o \text{ (after simplification)}}{o \text{ (before simplification)}}$ | 0.82 | 0.69 | 0.59 |

Table 3

Computation Complexity for an antenna array with 128 antennas

|  | $N_d = 15$ | $N_d = 20$ | $N_d = 25$ |
|---|---|---|---|
| $\dfrac{o \text{ (after simplification)}}{o \text{ (before simplification)}}$ | 0.85 | 0.77 | 0.7 |

Table 4

Computation Performance for an antenna array with 64 antennas

|  | $N_d = 10$ | $N_d = 15$ | $N_d = 20$ |
|---|---|---|---|
| $\dfrac{\text{average SE with simplification}}{\text{average SE without simplification}}$ | 0.9908 | 0.9893 | 0.9786 |
| $\dfrac{\text{edge SE with simplification}}{\text{edge SE without simplification}}$ | 1 | 0.99 | 0.98 |

Table 5

Computation Performance for an antenna array with 128 antennas

|  | $N_d = 15$ | $N_d = 20$ | $N_d = 25$ |
|---|---|---|---|
| $\dfrac{\text{average SE with simplification}}{\text{average SE without simplification}}$ | 1 | 0.99 | 0.977 |
| $\dfrac{\text{edge SE with simplification}}{\text{edge SE without simplification}}$ | 1 | 0.99 | 0.96 |

Table 6

Fig. 7

METHOD FOR DETERMINING A PRECODING MATRIX AND PRECODING MODULE

This application is a National Phase entry application of International Patent Application No. PCT/CN2015/081679 filed Jun. 17, 2015, hereby incorporated by reference in its entirety.

FIELD

Embodiments described herein generally relate to a method and a module for determining a precoding matrix.

BACKGROUND

Multi-antenna transmission also referred to as multiple-input multiple-output (MIMO) antenna transmission allows for significant improvements in spectrum efficiency achieved over a wireless link. Using an antenna array comprising more than one antenna at a transmitter further increases a spatial degree of freedom. An antenna array may be controlled by a controller to form an antenna beam towards a receiver. An antenna array may further be controlled by the controller to achieve multiplexing gain by supporting multiple receivers concurrently. In other words, a MIMO communication system may use a plurality of channels in a spatial area concurrently. The capacity of data transmission may be increased through MIMO transmission schemes.

Two types of MIMO transmission schemes are known. A single-user MIMO (SU-MIMO) is used to transmit one data stream to a single user or a single receiver over a time-frequency resource. A multi-user MIMO (MU-MIMO) may transmit one data stream per user to at least two co-scheduled users or receivers over a single, i.e. a same time-frequency resource. MIMO technique has been adopted in 3GPP long term evolution (LTE) systems. In LTE advanced (LTE-A) standard up to eight transmit antennas forming an antenna array are admitted.

So-called massive MIMO systems or large-scale MIMO systems may employ a large number of transmit antennas, e.g. tens or even more than 100 antennas in an antenna array. Massive MIMO is under discussion for 5GPP, the 5$^{th}$ generation project. Massive MIMO or large scale antenna systems are capable of obtaining a further improvement of frequency efficiency.

There is a need to enhance multi-user MIMO communication especially employing massive MIMO transmitters.

BRIEF DESCRIPTION OF THE DRAWINGS

The accompanying drawings are included to provide a further understanding of aspects and are incorporated herein and constitute a part of the specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 5 illustrates in two tables a comparison of the cell average spectral efficiency between maximum ratio transmission (MRT), zero forcing (ZF), ratio of signal to leakage interference and noise (SLNR) and weighted minimum mean square error (weighted MMSE).

FIG. 6 illustrates a Woodbury formula lemma which may be utilized for transforming identically a first matrix expression into a second matrix expression.

FIG. 7 schematically illustrates in four tables a comparison of computation complexity before and after simplification effectuated by an illustrative selection module.

DESCRIPTION OF EMBODIMENTS

In the following, for purposes of explanation, numerous specific details are set forth in order to provide a thorough understanding of one or more aspects. However, it may be evident to a person skilled in the art that one or more aspects may be practiced to a lesser degree of these specific details. The following description is therefore not to be taken in a limiting sense. The scope of the protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect of only one of several implementations, such feature or aspect may be combined with one or more of the features or aspects of the other implementations as it may be desired an advantages for any given or particular application.

Further, to the extent that the terms "include", "have", "with" or other variants thereof are used in either the detailed description or the claims, such terms are intended to be inclusive in a manner similar to the term "comprise". Also the term "exemplary" is merely meant as an example rather than the best optimum.

The specified embodiments may be part of a mobile communication system. Further, the embodiments may be part of a cellular mobile radio system. More specifically, transmitter in a cellular mobile system may comprise an antenna array which may be a massive MIMO antenna. Embodiments may comprise a transmitter comprising a controller configured for a multi-user MIMO system. Embodiments may comprise a precoding module which is part of the controller. Embodiments may comprise a base station comprising a transmitter.

Figure 1:
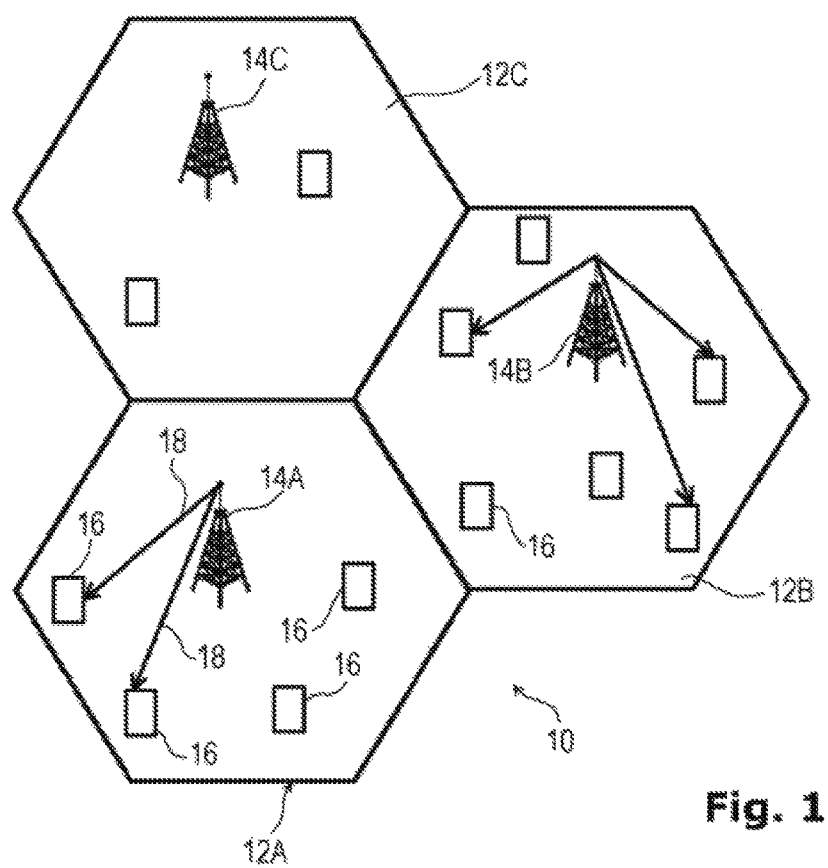
FIG. 1 schematically illustrates a cellular mobile system that may utilize a precoding matrix for a MIMO transmitter based on a weighted MMSE algorithm.

FIG. 1 schematically illustrates a cellular mobile system 10 comprising three cells 12A, 12B, 12C. It is to be understood that the cellular system 10 may comprise more than three cells 12. Each cell 12A, 12B, 12C comprises at least one transmitter 14A, 14E, 14C. Transmitters 14 may be part of base stations. The base stations may be referred to as NodeBs. The base stations may be evolved NodeBs (eNB). Each cell 12A, 12B, 12C may comprise at a given moment a number of receivers 16. Receivers 16 may be user terminals or user equipment UE. A user terminal may be, for example, a smartphone, a tablet, a laptop and so on. A user terminal may comprise a single antenna. A user terminal may comprise an antenna array. In the schematic representation of FIG. 1, cell 12A comprises four receivers 16, cell 12B comprises six receivers 16 and cell 12C comprises two receivers 16. The person skilled in the art understands that more users or user terminals may be included in each cell. There may be inter-cellular and/or intra-cellular interferences.

In FIG. 1, transmitter 14A transmits data signals in two data streams to two receivers 16. Data streams are indicated by arrows 18. Transmitter 14B transmits data streams 18 to three receivers 16 and transmitter 14C transmits no data signals or streams. A data transmission from a base station to a user terminal is referred to as a downlink transmission. As known in the art, a base station also comprises a receiver and a user terminal also comprises a transmitter. A data transmission from a user terminal to a base station is referred to as an uplink transmission. Without limitation, the following discussion of embodiments is given for a downlink communication.

Figure 2:
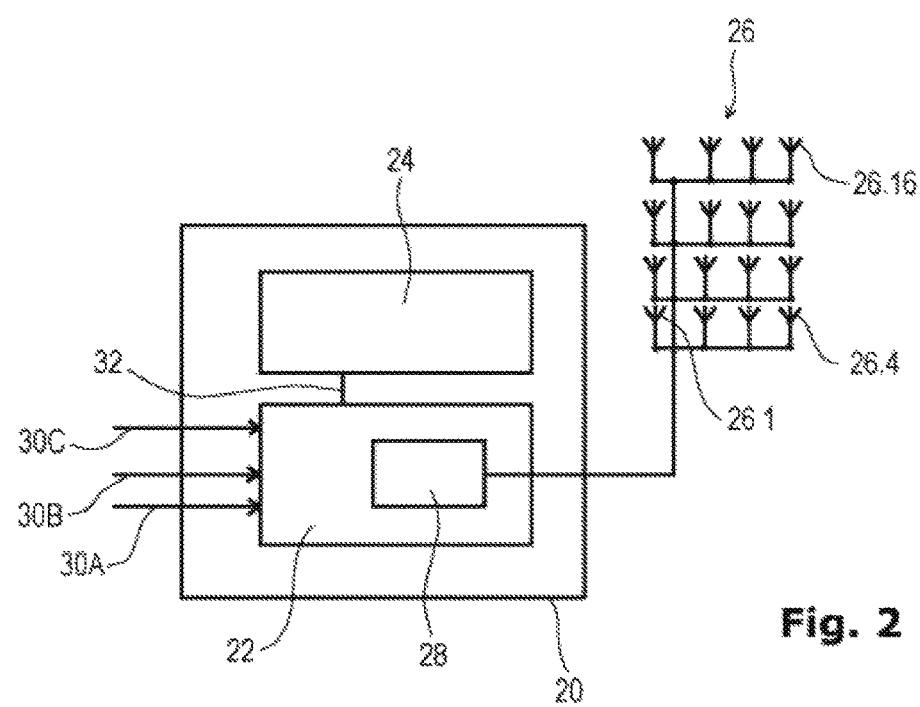
FIG. 2 schematically illustrates a block diagram of a base station that may comprise a precoding module for determining a precoding matrix for a MIMO transmitter based on a weighted MMSE algorithm.

FIG. 2 schematically illustrates a block diagram of a base station 20. Only components necessary to understand the disclosure are shown. Of course, the base station may comprise many more components. Base station 20 comprises a transmitter 22 and a receiver 24. Base station 20 further comprises an antenna array 26 with 16 antennas 26.1 to 26.16. The number of sixteen antennas is only given as an example. Antenna array 26 may comprise more or less antennas. Antenna array 26 may comprise e.g. 8 antennas or 64 antennas, or 100 antennas or even more. Transmitter 22 comprises a controller. The controller may comprise a precoding module 28. The controller may be configured to control the antenna array 26 for a MU-MIMO transmission. Precoding module 28 may be hardware module comprising a processor and a memory. Precoding module 28 may be a software module loaded into a non-transitory computer readable medium. The processor may include a digital signal processor (DSP), one or more processor cores, a central processing unit (CPU), a dual co-processor, a multiple co-processor, a microprocessor, a micro-chip, a chip, one or more circuits, a plurality of processors or controllers and so on. Transmitter 22 may receive data streams 30A, 303, 30C to be transmitted to different user terminals via a radio interface or air interface. Data streams 30A, 30B, 30C may be provided to base station 20 via a wired communication network. Transmitter 22 may be coupled to receiver 24 by a data connection line 32.

MU-MIMO and especially MIMO for multiple users with many antennas or even massive MU-MIMO with over hundreds of antennas allow for space division multiple access (SDMA). The cellular system 10 may comprise urban micro-cells and the spatial multiplexing may allow to take into consideration a three dimensional channel model or in other words, a location of a user or user terminal in a three dimensional space. While any frequency band may be used, the fifth generation project takes into consideration a frequency band from about 2 GHz to about 3.5 GHz. Other frequency bands with frequencies lower or higher may be used.

MU-MIMO allows transmitting to different terminals using the same time-frequency resource. A precoding scheme may be used by the controller and more specifically by a precoder as part of the controller to map the signals to be multiplexed to the antennas of the antenna array.

Figure 3:
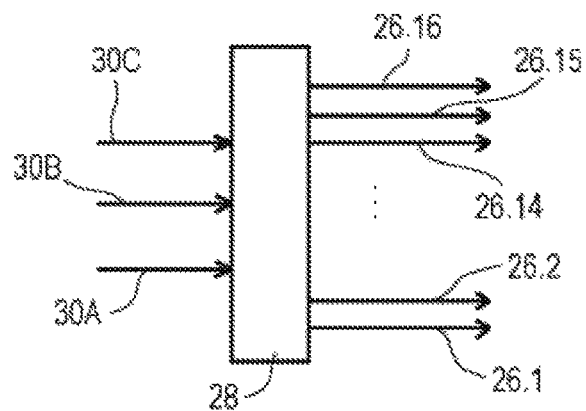
FIG. 3 schematically illustrates input and output to the precoding module of FIG. 2.

FIG. 3 illustrates the task of precoding and beam forming effectuated by the controller and more specifically by the precoding module 28. The same reference signs as in FIG. 2 are used. A precoding matrix is used to multiply with signals to be transmitted. Precoding controls phase and amplitude of the antennas of an antenna array in order to form a pattern of radiation. Precoding further takes into account e.g. channel information and terminals. Applying the precoding matrix allows beam forming, i.e. directing radiation energy to a user. Precoding module 28 receives $N_D$ data streams intended for $N_D$ user terminals. It is to be understood that one user terminal may also receive more than one data stream. For ease of explication in the application one user terminal may receive one data stream. In the case illustrated in FIG. 3 three data streams 30A, 30E, 30C are input to controller 28, i.e. $N_D$=3. Data streams 30A, 30B, 30C are mapped to $N_T$ antennas. In the case illustrated in FIG. 3 $N_T$=16.

Figure 4A:
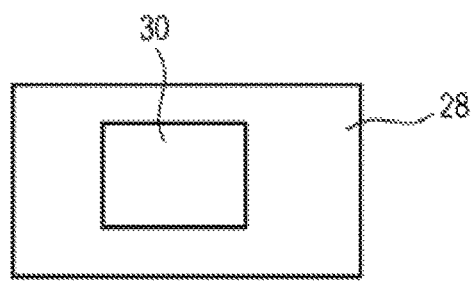
FIGS. 4A-4C schematically illustrate different precoding module embodiments which may be adapted to determine a precoding matrix for a MIMO transmitter based on a weighted MMSE algorithm.
Figure 4B:
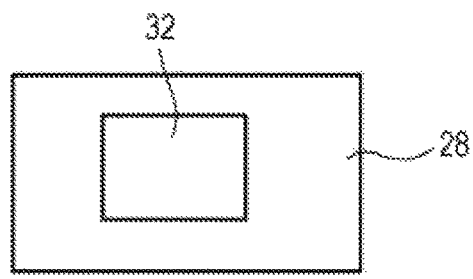
Figure 4C:
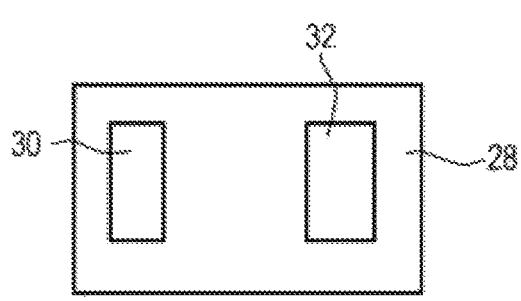

FIGS. 4A to 4C illustrate precoding module 28 according to embodiments described below. In an embodiment as illustrated in FIG. 4A precoding module 28 may comprise a Woodbury module 30. In an embodiment as illustrated in FIG. 4B precoding module 28 may comprise a selection module 32. In an embodiment as illustrated in FIG. 4A precoding module 28 may comprise a Woodbury module 30 and a selection module 32. More generally, a controller controlling transmission of data streams from transmitter 22 may comprise a Woodbury module 30 and/or a selection module 32.

In the following, precoding is further explained. Precoding may improve performance of the transmission and may take into account the influence of the transmission channel respectively the transmission channels. Precoding may provide weights to weight the multiple data streams which are transmitted from an antenna array to maximize the throughput of a link. Precoding is part of 3GPP releases 8 and 10. The plurality of transmit antennas in the antenna array form, using precoding, a plurality of transmission channels. Each of the plurality of transmission channels is configurable to serve a respective user terminal. A channel influence is given in a channel matrix.

Several linear precoding schemes are known. A first linear precoding scheme is maximum ratio transmission (MRT, sometimes also called conjugation). According to this scheme, the precoding matrix is equal to the conjugation of channel so the computation is very simple. The computation does not e.g. require any matrix inversion. However, the performance is very poor in multi-user mode due to interference among different users.

Another linear precoding scheme is zero forcing (ZF). In this case, the precoding matrix is obtained by minimizing mutual interferences. However, ZF cannot support too many users. The multiplexing gain may be attractive when a number of scheduled users or receivers is much smaller than the number of transmit antenna. However, when scheduled user number is close to the transmit antenna number, the gain will begin to decrease and may vanish if the user number continuous to increase.

Another approach of linear precoding is to minimize the ratio of signal to leakage interference and noise (SLNR). The preceding matrix is then obtained by making a trade-off between the signal power and leakage interference plus noise. However, the algorithm is sensitive to noise power.

In a multi-user system the performance cannot be simultaneously maximized for all users. In the above mentioned linear precoding schemes MRT, ZF and SLNR power allocation between multiple users is ignored. Furthermore, the above algorithms do not take the throughput capacity as their optimizing criterion. In a MU-MIMO a multi-objective optimization problem must be solved. In other words, for multi user a maximization of the capacity is searched. The problem may be simplified by selecting a system utility function.

An approach to linear precoding which takes into account the multi-objective optimization problem is the weighted MMSE (minimum mean square error). Weighted MMSE achieves good performance for MU-MIMO. Weighted MMSE is a linear transceiver design algorithm. It is a weighted sum rate maximization that is based on iterative minimization of weighted mean squared error. Only local channel knowledge is needed. The weighted MMSE utilizes an iterative algorithm to optimize the precoding matrix and the system capacity. Weighted MMSE may take the system spectral efficiency as optimization target and iteratively calculate the precoding matrices and power weighted factors. Weighted MMSE uses an equivalent transformation between SINR and MSE at receivers and introduces a weighted matrix to get a linear optimization process. However, the computational task is heavy Weighted MMSE requires to execute an $N_T \times N_T$-dimension matrix inversion, where $N_T$ is the transmit antenna number. An $N_T \times N_T$-dimension matrix is a quadratic matrix which has $N_T$ rows and $N_T$ columns. An $N_T \times N_T$-dimension matrix or $N_T$-by-$N_T$ matrix is also called a matrix having a rank of $N_T$ or a matrix having an order of $N_T$. In a large-scale antenna system with many or massive antennas, the computational complexity especially of the matrix inversion may become very high. Therefore, weighted MMSE may be difficult to implement in realistic systems.

Further to precoding, a MU-MIMO system may provide for scheduling. Scheduling controls allocation of shared resources among users. In FIG. 3, $N_D$ data streams are active and wait for being scheduled. They may not be necessarily all scheduled at the same time. Or in other words, optimization may show that not all data streams can be served at the same time-frequency resource with sufficient quality. It is therefore possible to distinguish between scheduled users and selected effective users. Rather than speaking of users one may also speak of data links or transmission links between transmitter and receiver established prior to data transmission. Then, there are scheduled links and selected links.

In the following a weighted MMSE approach is further discussed. An object of the optimization problem may be to enhance a cell average spectral efficiency. The optimization may be performed at precoding module 28. A limit or constraint to the optimization problem to be solved may be a maximum available power. A base station may have a power constraint $P_k$. A base station k may serve $I_k$ scheduled users. A utility maximization problem may be formulated maximizing the weighted sum rate of power factors for all scheduled users for the base station k.

$$\max_{i,k} \left\{ \sum_{i_k=1}^{l_k} R_{i_k} \right\} \quad (1)$$

The sum rate according to equation (1) represents an objective function for the optimization process. An instantaneous achievable rate of a user $I_k$ may be expressed as $$R_{i_k} = \log \left\{ \det \left( I + H_{i_k,k} w_{i_k} w_{i_k}^* H_{i_k,k}^* \left( \sum_{j_k=1, j_k \neq i_k}^{l_k} H_{i_k,k} w_{i_k} w_{i_k}^* H_{i_k,k}^* + \sigma_{i_k}^2 I \right)^{-1} \right) \right\} \quad (2)$$

In equation (2), I denotes the unit vector or identity matrix. $H_{i_k,k}$ denotes the channel matrix comprising channel information. $w_{i_k}$ denotes the precoding matrix. The index $i_k$ designates user $i_k$. Matrix $w_{i_k}$ is more specifically a vector or a one dimensional matrix when the user terminal comprises only one antenna. The "*" indicates the conjugate-transpose or HERMITIAN transpose of the corresponding matrix. The conjugate-transpose or HERMITIAN transpose is also indicated by "$H$". Thus, $H_{i_k,k}$* denotes the conjugate transpose or Hermitian transpose of $H_{i_k,k}$. $H_{i_k,k}$ is a vector with $N_T$ elements, i.e. with an element for each transmit antenna. In other words, $H_{i_k,k}$ is a $1 \times N_T$ dimension matrix. Then, $H_{i_k,k}$* is a $N_T \times 1$ dimension matrix and the product $H_{i_k,k} H_{i_k,k}$* is a $N_T \times N_T$ dimension matrix. Index k indicates the kth base station. A communication system may comprise k base stations. In the following, embodiments will be discussed without limitation for a system with one base station. Then, k=1 and may not be mentioned in further equations. In equation (2), $\sigma_{i_k}$ stands for an expectation value of noise power at user $i_k$ receiver. Equation (1) designates the sum of all calculated rates for all scheduled users according to equation (2).

The communication system 10 may use time division duplex (TDD). In a TDD system time division multiplexing is used to separate a transmit and a receive signal. An advantage of a TDD system is that the uplink and downlink radio paths are likely to be very similar. Therefore, the precoding matrix may be generated based on channel information coming from channel reciprocity. In other words, in the case of TDD the forward link and the reverse link share the same frequency band so the physical propagation channels can be assumed to be reciprocal if the channel varies slowly compared to the interval between forward and reverse link transmissions. In FIG. 2, a data line 32 indicates a data transmission or rather an information transmission between receiver 24 and transmitter 22 to transmit channel information from receiver 24 to transmitter 22. Reciprocity may indicate that the forward channel or downlink channel, i.e. the channel from the base station to the terminal, may be estimated from the reverse channel or the uplink channel, i.e. the channel from the terminal to the base station. Thus, the channel matrix $H_{i_k,k}$ can be considered to be known. Of course, channel matrix $H_{i_k,k}$ may be determined in other ways.

Precoding module 28 may comprise an iteration module. In weighted MMSE the precoding matrix $w_{i_k}$ may be iteratively optimized. First, the precoding matrix $w_{i_k}$ may be initialized such that the sum of power factors of all users is $$\sum_{i_k=1}^{l_k} \|w_{i_k}\|^2 = P_k \quad (3)$$

Then, optimization process may start in the iteration module using an iterative algorithm. The iteration module may be a software module or a hardware module. Each iteration round may comprise three consecutive updates.

First Update:

$$U_{i_k} = J_{i_k}^{-1} H_{i_k,i} w_{i_k} \text{ with } J_{i_k} = \sum_{j_k=1}^{l_k} H_{i_k,k} w_{j_k} w_{j_k}^* H_{i_k,k}^* + \sigma_{i_k}^2 I \quad (4)$$

In equation (4) $w_{i_k}$ is taken as a static value and first $J_{i_k}$ is calculated and then $U_{i_k}$ can be updated. $U_{i_k}$ represents an optimum receiving precoder for user $i_k$. $J_{i_k}$ has no special meaning but allows for a simple and clear expression.

Second Update:

$$E_{i_k} = (I - w^*_{i_k} H^*_{i_k,k} U_{i_k})^{-1} \quad (5)$$

In equation (5) $E_{i_k}$ represents the minimum mean square error (MSE) value for user$_{i_k}$. Equation (5) uses the new, i.e. the updated value of $U_{i_k}$. Precoding vector $w_{i_k}$ is still taken as a static value.

Third Update:

$$w_{i_k} = \left( \sum_{j_k=1}^{l_k} H^*_{j_k,k} U_{j_k} E_{j_k} U^*_{j_k} H_{j_k,k} + \mu_k I \right)^{-1} H^*_{i_k,k} U_{i_k} E_{i_k} \quad (6)$$

Using updated $U_{i_k}$ from equation (4) and updated $E_{i_k}$ from equation (5), the preceding vector $w_{i_k}$ for user $i_k$ is recalculated or updated. Equation (6) comprises a Lagrange multiplier $\mu_k$. Lagrange multipliers are known in optimization processes for finding local maxima and minima. More precisely, it is a strategy used for a function which is subject to equality constraints. Here, Lagrange multiplier $\mu_k$ is used to satisfy the power constraint according to equation (3). During update of $w_{i_k}$ $\mu_k$ is also updated to satisfy the transmitting power constraint as is explained in more detail below. The updated precoding vector $w_{i_k}$ is then used to recalculate rate $R_{i_k}$ for user $i_k$ according to equation (2).

Recalculation of precoding vector $w_{i_k}$ and $R_{i_k}$ is Performed for all scheduled users and entered into equation (1) to determine the rate sum. Convergence of the objective function is e.g. determined by comparing the current rate sum $R_{current}$ to the last rate sum $R_{last}$.

$$|R_{current} - R_{last}| < \varepsilon |R_{current}| \quad (7)$$

where $\varepsilon$ is a threshold such as 0.05. If the value of equation (1), i.e. the objective function remains stable around a specific value the objective function converges and calculation may be stopped. Otherwise, new iterations are executed.

Calculation of precoding vector $w_{i_k}$ according to equation (6) is a difficult and computationally intensive task because it involves an $N_T \times N_T$ dimension matrix inversion:

$$\left( \sum_{j_k=1}^{l_k} H_{j_k,k} U_{j_k} E_{j_k} U^*_{j_k} H^*_{j_k,k} + \mu_k I \right)^{-1} \quad (8)$$

As can be seen, expression (8) is part of equation (6). An $N_T \times N_T$ dimension matrix inversion means a computation complexity which is proportional to the cube of transmit antenna number $N_T$. As an example, with 64 transmit antennas being employed at a base station $64^3 = 262,144$ multiplications and additions are to be solved. This causes a huge complexity pressure for systems with large scale or massive antenna arrays. As a result, computation is very complex for large scale MIMO systems and may necessitate the use of powerful processors and/or very fast processors and may even not be realizable. Then, weighted MMSE might not be used and the precoding matrix might be calculated based on MRT, ZF or SLNR.

Furthermore as mentioned above, expression (8) comprises the Lagrange multiplier $\mu_k$. Updating Lagrange multiplier $\mu_k$ to satisfy the power constraint according to equation (3) leads to $$\sum_{i_k=1}^{l_k} \|w_{i_k}\|^2 = Tr \left( \left( \sum_{j_k=1}^{l_k} H^*_{j_k,k} U_{j_k} E_{j_k} U^*_{j_k} H_{j_k,k} + \mu_k I \right)^{-2} \right. \quad (9)$$

$$\left. \sum_{j_k=1}^{l_k} H^*_{i_k,k} U_{i_k} E^2_{i_k} U^*_{j_k} H_{j_k,k} \right) = P_k$$

In equation (9), an $N_T \times N_T$ dimension singular value decomposition is to be performed. The complexity of the singular value decomposition is also roughly proportional to the cube of transmit antennas number and adds to the complexity of calculation and may hinder deployment of MU-MIMO.

FIG. 5 includes two tables providing a comparison of the cell average spectral efficiency between MRT, ZF, SLNR and weighted MMSE. In Table 1 the cell average spectral efficiency is compared for an antenna array with 64 antennas where as in Table 2 the cell average spectral efficiency is compared for an antenna array with 16 antennas. MRT is set as bench mark. Compared to MRT, use of a ZF algorithm, an SLNR algorithm or a weighted MMSE algorithm to calculate the precoding matrix leads already to an improvement of one third when only two users are scheduled. When all users are scheduled, the improvement is still about one third for ZF algorithm but the cell average spectral efficiency doubles for SLNR algorithm and is even one and a half better for weighted MMSE. The term "all users" refer to all users in the cell being scheduled in contrast to a situation where only some of the users in a cell are scheduled. It is to be understood that the user number in each cell is a random variable.

Table 2 confirms the trend that weighted MMSE is much more efficient in multi-user systems and an abandoning of weighted MMSE due to a too high computation burden would be a huge disadvantage. Embodiments discussed herein propose a way to use weighted MMSE for multi-user systems with less calculation burden.

In an embodiment, precoding module 28 is provided with a Woodbury module 30 as shown in FIG. 4A which is configured to perform the following transformations. Woodbury module 30 may be a software module or a hardware module. Instead of performing the optimization process described above for each scheduled user separately, all precoding vectors of the scheduled users may be expressed in a matrix:

$$W = [w_{l_k} \ldots w_{i_k} \ldots w_{l_k}] = (\tilde{H}_k \Lambda_k \tilde{H}_k^* + \mu_k I)^{-1} \tilde{H}_k \Theta_k \quad (10)$$

In equation (10), $\tilde{H}_k$ is an $N_T \times N_D$ matrix which comprises the channel information of all scheduled user equipment as shown in $$\tilde{H}_k = [H^*_{l_1,k} \ldots H^*_{l_i,k} \ldots H^*_{l_k,k}] \tag{11}$$

$\Lambda_k$ and $\Theta_k$ are diagonal matrices. A diagonal matrix is a matrix which has elements unequal to zero only on the main diagonal.

$$\begin{cases} \Lambda_k = \mathrm{diag}\{[U_{l_1}E_{l_1}U^*_{l_1} \cdots U_{l_i}E_{l_i}U^*_{l_i} \cdots U_{l_k}E_{l_k}U^*_{l_k}]\} \\ \Theta_k = \mathrm{diag}\{[U_{l_1}E_{l_1} \cdots U_{l_i}E_{l_i} \cdots U_{l_k}E_{l_k}]\} \end{cases} \tag{12}$$

With $\tilde{H}_k$ being an $N_T \times N_D$ matrix, equation (10) still comprises an $N_T \times N_T$ dimension matrix inversion. In order to reduce complexity, Woodbury formula lemma is used to perform a transformation.

FIG. 6 illustrates a Woodbury formula lemma or Woodbury matrix identity formula. In Woodbury formula lemma:
  Set A to matrix$I_{[N_i \times N_i]}$ which is an $N_T \times N_T$ matrix.
  Set U to matrix$H_{[N_i \times N_d]}$ which is an $N_T \times N_D$ matrix.
  Set V to matrix$H^H$ which is an $N_D \times N_T$ matrix because it is the hermitian conjugate of matrix $H_{[N_i \times N_d]}$.
  Set C to matrix $\mu_k^{-1} I_{[N_d \times N_d]}$ which is an $N_D \times N_D$ matrix. Then from math derivation:

$$H(\mu_k I + H^H H)^{-1} = (\mu_k I + H H^H)^{-1} H \tag{13}$$

and further transformation:

$$(\tilde{H}_k \Lambda_k \tilde{H}_k^H + \mu_k I)^{-1} \tilde{H}_k = ((\tilde{H}_k \sqrt{\Lambda_k})(\tilde{H}_k \sqrt{\Lambda_k})^H + \mu_k I)^{-1} (\tilde{H}_k \sqrt{\Lambda_k})(\sqrt{\Lambda_k})^{-1} \tag{14}$$

Regarding $(\tilde{H}_k \sqrt{\Lambda_k})$ as a unity like H and following the same transformation principle:

$$(\tilde{H}_k \Lambda_k \tilde{H}_k^H + \mu_k I)^{-1} \tilde{H}_k = \tilde{H}_k \sqrt{\Lambda_k} (\sqrt{\Lambda_k} \tilde{H}_k^H \tilde{H}_k \sqrt{\Lambda_k} + \mu_k I)^{-1} (\sqrt{\Lambda_k})^{-1} \tag{15}$$

Equation (15) can be entered into equation (10) leading to $$W = \tilde{H}_k \sqrt{\Lambda_k} (\sqrt{\Lambda_k} \tilde{H}_k^* \tilde{H}_k \sqrt{\Lambda_k} + \mu_k I)^{-1} (\sqrt{\Lambda_k})^{-1} \Theta_k \tag{16}$$

In equation (16), matrix inversion of $\sqrt{\Lambda_k}\tilde{H}_k^* \tilde{H}_k \sqrt{\Lambda_k} + \mu_k I$ and of $\sqrt{\Lambda_k}$ is needed. Matrix $\sqrt{\Lambda_k}$ is a diagonal $N_T \times N_T$ matrix. Inversion of a diagonal matrix is computational easy independently of the dimension or order or rank of the matrix. Therefore, inversion of $\sqrt{\Lambda_k}$ is does not represent a computational problem. The dimension of the matrix $\sqrt{\Lambda_k}\tilde{H}_k^* \tilde{H}_k \sqrt{\Lambda_k} + \mu_k I$ is $N_D \times N_D$. In other words, use of Woodbury formula in the Woodbury module of precoding module 28 reduces the complexity of the matrix inversion from a computation complexity proportional to the cube of number of transmission antennas to a computation complexity proportional to the cube of number of scheduled users.

Using equations (14) and (15), the equation (9) may be simplified to:

$$\sum_{i_k=1}^{l_k} \|w_{i_k}\|^2 = Tr(H\Lambda_k(H\Lambda_k H^* + \mu_k I)^{-2} E \Lambda_k^* H^*)) = P_k \tag{17}$$

The expression $H\Lambda_k H^*$ is an $N_D \times N_D$ matrix. So the complexity of the singular value decomposition is reduced by the Woodbury module to a computational complexity proportional to the cube of number of scheduled users.

It is to be understood that Woodbury formula lemma provides an identical transformation. The $N_T \times N_T$ dimension matrix inversion to an $N_D \times N_D$ dimension matrix inversion is without any performance loss. Tables 1 and 2 shown in FIG. 5 are equally valid for the computationally simplified weighted MMSE.

In an embodiment, precoding module 28 may be provided with the selection module 32 shown in FIG. 4B. The selection module 32 may be a software module or a hardware module. The selection module 32 may be adapted to select effective data streams out of scheduled data streams during the optimization process or in other words during iteration. Scheduled data streams are streams scheduled to be transmitted to scheduled users or in other words to scheduled receivers. Effective data streams are data streams which may be effectively sent to effective users or effective receivers as explained above.

During iteration it can be observed that scheduled users or receivers gradually divide into two groups. Power factors of users in a first group decrease and may finally become zero. Power factors of users in a second group become stable. The second group of users or receivers may be named effective users or effective receivers. In other words, not all scheduled users can be served at the same time-frequency resource.

The selection module 32 is configured to select the effective data streams during iteration or in other words during the iterative process, i.e. before the end of the optimization process. In detail, a selection method may comprise updating $U_{i_k}$ and $w_{i_k}$ according to equations (4) to (6) a first time and recording all scheduled user rates or user capacities $R = \{R_1, R_2, \ldots R_l\}$. Then update $U_{i_k}$, $E_{i_k}$ and $w_{i_k}$ a second time and record all scheduled user current capacities R'. Then find selected user sets $\tilde{I}$ which satisfy:

$$\forall i \in \tilde{I}, \mathrm{abs}(R'_i - R_i)/R_i > 0.05 \tag{18}$$

It is to be understood that "0.05" is an exemplary value which may be greater or smaller. Then computing of the precoding matrix respectively the precoding matrix is continued with the selected users only. This may simplify computation as less users are to be taken into account for computation.

In an embodiment, precoding module 28 may be provided with the selection module 32 and the Woodbury module 30 as shown in FIG. 4C. During the iteration process the selection module 32 selects selected user sets $\tilde{I}$. The Woodbury module transforms according to Woodbury formula to reduce computation complexity, especially by avoiding matrix inversion of a matrix having an $N_T \times N_T$ dimension or rank. In this embodiment, computation complexity is reduced to:

$$o(2(2N_T N^2_d + 3N^3_d) + (N_{iter} - 2)*(2N_T N^2_{eff} + 3N^3_{eff})) \tag{19}$$

"o" standing for computation complexity.

FIG. 7 includes Tables 3 and 4 illustrating a comparison of computation complexity and performance before and after simplification effectuated by the selection module 32. Simplification stands for simplifying the computational task by limiting to effective users as explained above. In Table 3 the number of transmit antennas is $N_T = 64$ and the number of scheduled users $N_D$ is 10, 15 respectively 20. The iteration process comprises seven rounds. In Table 4 the number of antennas is $N_T = 128$ and the number of scheduled users $N_D$ is 15, 20 respectively 25. The iteration process comprises seven rounds. The more users are scheduled the more the computation complexity is decreased for a same channel matrix, i.e. for a same number of possible effective users.

Simplification or in other words taking into account only effective users after starting iteration process decreases slightly the performance of the precoding matrix but the performance loss remains under 3% as illustrated in Tables 5 and 6. Table 5 corresponds to Table 3 in terms of number of antennas and scheduled users. Table 6 corresponds to Table 4 in terms of number of antennas and scheduled users. SE stands for spectral efficiency.

Figure 8:
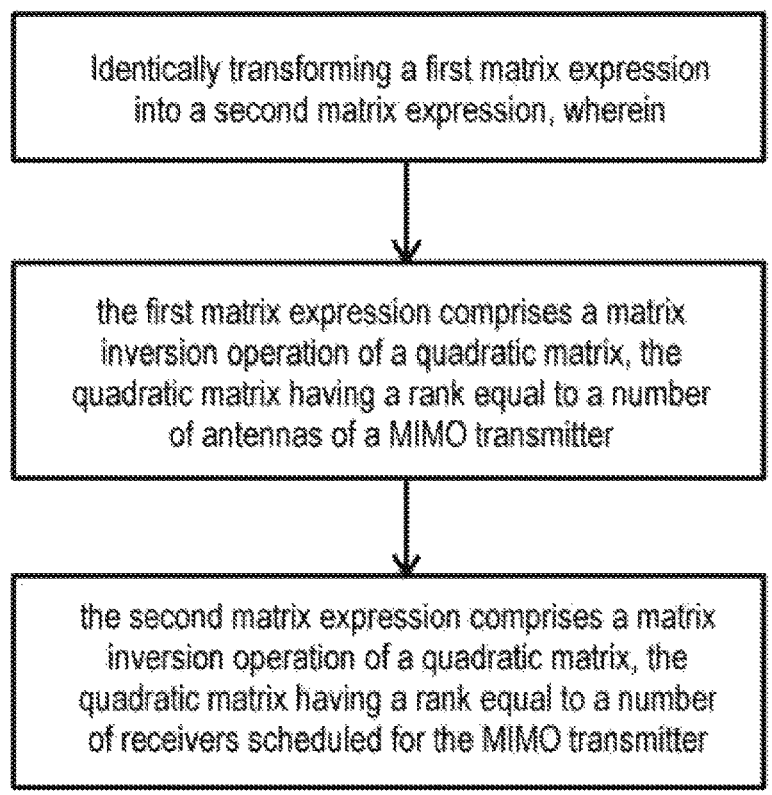
FIG. 8 schematically illustrates in a flow chart an illustrative method for determining a precoding matrix for a MIMO transmitter based on a MMSE algorithm.

FIG. 8 shows in a flow chart an illustrative method for determining a precoding matrix for a MIMO transmitter based on a MMSE algorithm. During computation, a first matrix expression is identically transformed into a second matrix expression. The first matrix expression comprises a matrix inversion operation of a quadratic matrix. The quadratic matrix has a rank equal to a number of antennas of a MIMO transmitter. In other words, the more antennas a MIMO transmitter comprises the higher is the rank. The second matrix expression into which the first matrix expression is transformed comprises a matrix inversion operation of a quadratic matrix which has a rank equal to a number of receivers scheduled for the MIMO transmitter. The number of scheduled receivers may be considerably lower than the number of antennas. Then the matrix inversion operation is simplified.

Figure 9:
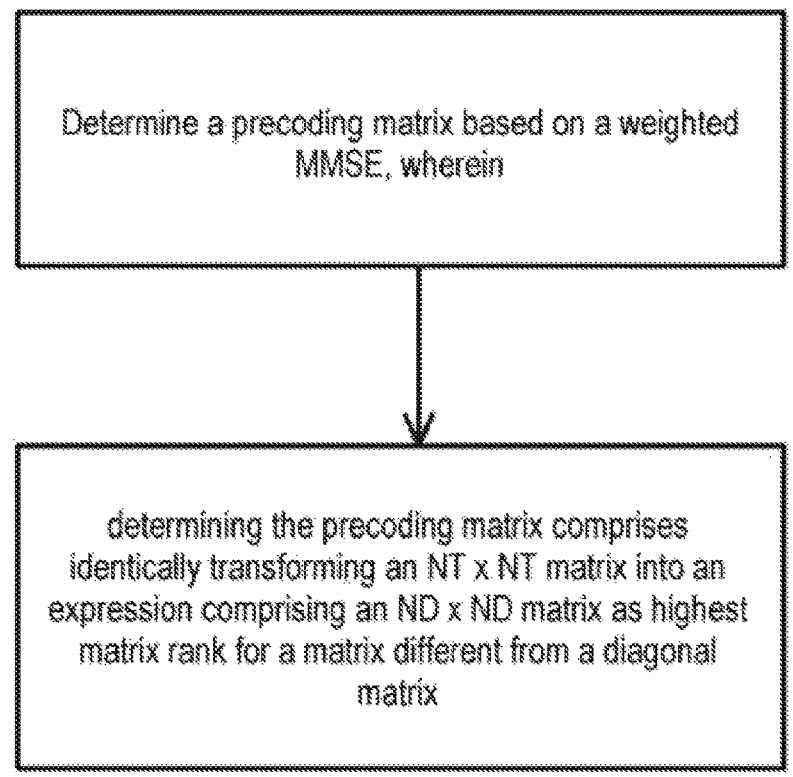
FIG. 9 schematically illustrates in a flow chart an illustrative method for determining a precoding matrix for a transmit antenna array comprising NT antennas and configured to serve ND receivers.

FIG. 9 shows in a flow chart an illustrative method for determining a precoding matrix for a transmit antenna array comprising NT antennas and configured to serve ND receivers. A precoding matrix is determined based on a weighted MMSE. Determining the precoding matrix comprises to transform identically an NT×NT matrix into an expression comprising an ND×ND matrix as highest matrix rank for a matrix different from a diagonal matrix. A matrix inversion operation is easily effectuated on a diagonal matrix. A high rank diagonal matrix does not comprise computational burden.

Figure 10:
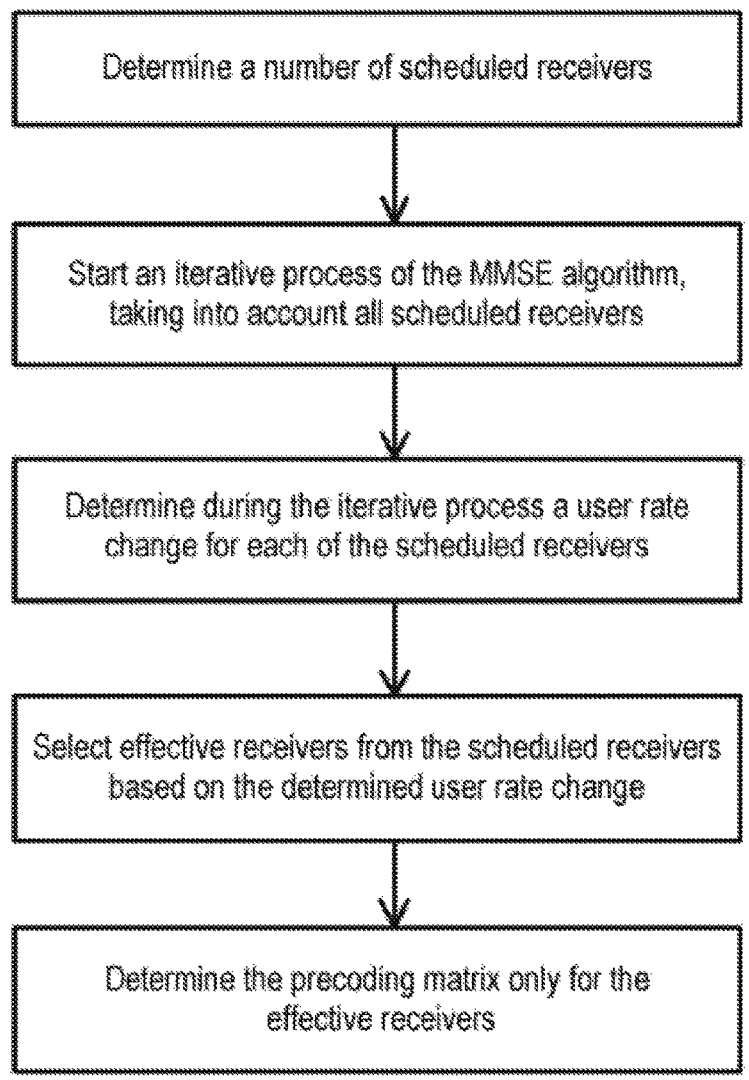
FIG. 10 schematically illustrates in a flow chart an illustrative method of determining a precoding matrix for a multi-user (MU) MIMO transmitter based on a weighted MMSE algorithm.

FIG. 10 shows in a flow chart an illustrative method of determining a precoding matrix for a MU-MIMO transmitter based on a weighted MMSE algorithm. A number of scheduled receivers is determined and an iterative process of the MMSE algorithm taking into account all scheduled receivers is started. The method further comprises determining during the iterative process a user rate change for each of the scheduled receivers and selecting effective receivers from the scheduled receivers based on the determined user rate change. The precoding matrix is determined only for the effective receivers.

The following examples pertain to further embodiments.

Example 1 is a method of determining by a controller and more specifically by a precoding module a precoding matrix for a multi-input multi-output (MIMO) transmitter using a weighted minimum mean square error (MMSE) algorithm, comprising: identically transforming by the controller a first matrix expression into a second matrix expression, the first matrix expression comprising a matrix inversion operation of a quadratic matrix having a rank equal to a number of antennas of the MIMO transmitter and the second matrix expression comprising a matrix inversion operation of a quadratic matrix having a rank equal to a number of receivers scheduled for the MIMO transmitter.

In Example 2, the subject matter of Example 1 can optionally include that identically transforming the matrix inversion operation comprises transforming according to Woodbury matrix identity formula.

In Example 3, the subject-matter of any of Examples 1 and 2 can optionally include: the second matrix expression further comprises a diagonal matrix of a rank equal to a number of antennas of the MIMO transmitter.

In Example 4, the subject-matter of any of Examples 1-3 can optionally include: transmitting by the MIMO transmitter signals to the scheduled receivers based on the determined precoding matrix.

In Example 5, the subject-matter of any of Examples 1-4 can optionally include: the weighted minimum mean square error (MMSE) algorithm comprises an optimization based on a sum-rate utility function.

In Example 6, the subject-matter of any of Examples 1-5 can optionally include: the weighted minimum mean square error (MMSE) algorithm comprises a singular value decomposition of a quadratic matrix having a rank equal to the number of receivers scheduled for the MIMO transmitter.

In Example 7, the subject-matter of any of Examples 1-6 can optionally include: the quadratic matrix which has a rank equal to a number of antennas of the MIMO transmitter comprises a Lagrange multiplier.

In Example 8, the subject-matter of any of Examples 1-7 can optionally include: the quadratic matrix which has a rank equal to a number of antennas of the MIMO transmitter comprises a sum of channel information related to the different receivers.

In Example 9, the subject-matter of Example 8 can optionally include: the channel information is based on channel reciprocity of an uplink and a downlink transmission.

Example 10 is a method of transmitting from a multi-input multi-output (MIMO) transmitter a plurality of signals to a plurality of receivers, including: determining by a controller and more specifically by a precoding module a precoding matrix using a weighted minimum mean square error (MMSE) algorithm, the determining comprising identically transforming by the controller a matrix inversion operation of a quadratic matrix having a rank equal to a number of antennas of the MIMO transmitter into a matrix inversion operation of a quadratic matrix having a rank equal to a number of receivers scheduled for the MIMO transmitter.

In Example 11, the subject-matter of Example 10 can optionally include: identically transforming the matrix inversion operation comprises transforming according to Woodbury matrix identity formula.

Example 12 is a controller and more specifically by a precoding module determining a precoding matrix for a multi-input multi-output (MIMO) transmitter, the controller and more specifically the precoding module using a weighted minimum mean square error (MMSE) algorithm, the controller and more specifically the precoding module identically transforming a matrix inversion operation of a quadratic matrix having a rank equal to a number of antennas of the MIMO transmitter into a matrix inversion operation of a quadratic matrix having a rank equal to a number of receivers scheduled for the MIMO transmitter.

In Example 13, the subject-matter of Example 12 can optionally include: a Woodbury module configured to identically transform the matrix inversion operation according to Woodbury matrix identity formula.

In Example 14, the subject-matter of any of Examples 12-13 can optionally include: a processor effectuating the transform operation and a memory storing the weighted minimum mean square error (MMSE) algorithm including an identity transformation algorithm.

Example 15 is a multi-input multi-output (MIMO) transmitter which may comprise the controller and more specifically the precoding module according to any of Examples 12 to 14.

Example 16 is a multi-input multi-output (MIMO) transmitter comprising a controller and more specifically a precoding module configured to determine a precoding matrix, the precoding module configured to use a weighted minimum mean square error (MMSE) algorithm, the precoding module configured to identically transform a matrix inversion operation of a quadratic matrix having a rank equal to number of antennas of the MIMO transmitter into a matrix inversion operation of a quadratic matrix having a rank equal to a number of receivers scheduled for the MIMO transmitter.

In Example 17, the subject-matter of Example 16 can optionally include: the controller or the precoding module further comprises a Woodbury module configured to identically transform the matrix inversion operation according to Woodbury matrix identity formula.

In Example 18, the subject-matter of any of Examples 16-17 can optionally include: the controller or the precoding module comprises a processor configured to effectuate the transform operation and a memory configured to store the weighted minimum mean square error (MMSE) algorithm including an identity transformation algorithm.

In Example 19, the subject-matter of any of Examples 16-18 can optionally include: the MIMO transmitter is part of a base station in a cellular communication system.

Example 20 is a non-transitory computer readable medium comprising program instructions causing a processor to determine a precoding matrix for a multi-input multi-output (MIMO) transmitter using a weighted minimum mean square error (MMSE) algorithm, the determination including: identically transforming a matrix inversion operation of a quadratic matrix having a rank equal to a number of antennas of the MIMO transmitter into a matrix inversion operation of a quadratic matrix having a rank equal to a number of receivers scheduled for the MIMO transmitter.

In Example 21, the subject-matter of Example 20 can optionally include: program instructions causing the processor to identically transform the matrix inversion operation according to Woodbury matrix identity formula.

Example 22 is a controller or more specifically a precoding module configured to determine a precoding matrix for a multi-input multi-output (MIMO) transmitter, the controller or the precoding module configured to transform a first expression comprising a matrix having a first rank into a second expression comprising a matrix having a second rank smaller than the first rank as highest order matrix prior to effectuating a matrix inversion transformation.

In Example 23, the subject-matter of Example 22 can optionally include: the controller/the precoding module is configured to transform the expression identically.

Example 24 is a method of determining by a controller or a precoding module a precoding matrix for a transmit antenna array serving $N_D$ receivers, the transmit antenna array comprising $N_T$ antennas, the method includes: determining a precoding matrix using a weighted MMSE, the determining comprising an identical transformation of an $N_T \times N_T$ matrix into an expression comprising an $N_D \times N_D$ matrix as highest matrix rank not being a diagonal matrix.

In Example 25, the subject-matter of Example 24 can optionally include: determining the precoding matrix comprises obtaining channel information.

In Example 26, the subject-matter of Example 25 can optionally include: obtaining the channel information comprises obtaining the channel information from an inverse transmission channel.

Example 27 is a base station for a cellular communication Time Division Duplex (TDD) system which comprises a transmit antenna array comprising $N_T$ antennas, a controller controlling transmission from the antenna array to at least two receivers, the controller comprising a matrix inversion module configured to effectuate a matrix inversion, the matrix inversion module further comprising a Woodbury module configured to transform a matrix to be inverted into an expression using Woodbury matrix identity formula.

In Example 28, the subject-matter of Example 27 can optionally include: the matrix inversion module comprises a Woodbury module using Woodbury matrix identity formula to transform a matrix inversion of a $N_T$-by-$N_T$ matrix to an expression comprising a "number of receivers"-by-"number of receivers" matrix.

Example 29 is a controller configured to determine a precoding matrix for a multi-input multi-output (MIMO) transmitter, the controller is configured to use a weighted minimum mean square error (MMSE) algorithm, the controller comprises an inversion module configured to identically transform a matrix inversion operation of a quadratic matrix having a rank equal to a number of antennas of the MIMO transmitter into an expression necessitating a matrix inversion operation of a quadratic matrix having a rank equal to a number of receivers scheduled for the MIMO transmitter.

In Example 30, the subject-matter of Example 29 can optionally include: a Woodbury module configured to identically transform the matrix inversion operation according to Woodbury matrix identity formula.

In Example 31, the subject-matter of any of Examples 29-30 can optionally include: a processor configured to effectuate the transform operation and a memory configured to store the weighted minimum mean square error (MMSE) algorithm including an identity transformation algorithm.

Example 32 is a controller and more specifically a precoding module determining a precoding matrix for a multi-input multi-output (MIMO) transmitter, the controller transforming a matrix rank prior to a matrix inversion transformation.

Example 33 is a method for operating a multi-input multi-output (MIMO) transmitter, the method includes: determining a precoding matrix for the MIMO transmitter using a weighted minimum mean square error (MMSE) algorithm, determining comprises: identically transforming a matrix inversion operation of a quadratic matrix having a rank equal to a number of antennas of the MIMO transmitter into a matrix inversion operation of a quadratic matrix having a rank equal to a number of receivers scheduled for the MIMO transmitter.

Example 34 is a method of determining by a controller and more specifically by a precoding module a precoding matrix for a multi-user multi-input multi-output (MU-MIMO) transmitter using a weighted minimum mean square error (MMSE) algorithm, the method includes: determining a number of scheduled receivers, starting an iterative process of the MMSE algorithm taking into account all scheduled receivers, determining during the iterative process a user rate change for each scheduled receivers, selecting effective receivers from the scheduled receivers depending on the determined user rate change, determining the preceding matrix only for effective receivers.

In Example 35, the subject-matter of Example 34 can optionally include: transmitting by the MU-MIMO transmitter signals to the effective receivers based on the determined precoding matrix.

In Example 36, the subject-matter of any of Examples 34-35 can optionally include: during determination of the precoding matrix: identically transforming by the controller a first matrix expression into a second matrix expression, the first matrix expression comprising a matrix inversion operation of a quadratic matrix having a rank equal to a number of antennas of the MIMO transmitter and the second matrix expression comprising a matrix inversion operation of a quadratic matrix having a rank equal to a number of the effective receivers.

Example 37 is a controller and more specifically a precoding module determining a precoding matrix for a multi-user multi-input multi-output (MU-MIMO) transmitter, the controller/preceding module using a weighted minimum mean square error (MMSE) algorithm, the controller/precoding module determines a number of receivers scheduled for the MU-MIMO transmitter, starts an iterative process of the MMSE algorithm taking into account all scheduled receivers, determines during the iterative process a user rate change for each scheduled receivers, selects effective receivers from the scheduled receivers depending on the determined user rate change, determines the precoding matrix only for effective receivers.

In Example 38, the subject-matter of Example 37 can optionally include: a processor effectuating the iterative process and a memory storing the weighted minimum mean square error (MM algorithm including a selection algorithm.

Example 39 is a multi-input multi-output (MIMO) transmitter including the subject-matter of any of Examples 37-38.

Example 40 is a non-transitory computer readable medium comprising program instructions causing a processor to determine a precoding matrix for a multi-input multi-output (MIMO) transmitter using a weighted minimum mean square error (MMSE) algorithm, the determination comprising: determining a number of receivers scheduled for the MU-MIMO transmitter, starting an iterative process of the MMSE algorithm taking into account all scheduled receivers, determining during the iterative process a user rate change for each scheduled receivers, selecting effective receivers from the scheduled receivers depending on the determined user rate change, determining the precoding matrix only for effective receivers.

While the invention has been illustrated and described with respect to one or more implementations, alterations and/or modifications may be made to the illustrated examples without departing from the spirit and scope of the appended claims. In particular, with regard to the various functions performed by the above described components or structures, the terms used to describe such components are intended to correspond, unless otherwise indicated, to any component or structure which per-forms the specified function of the described component (e.g. that is functionally equivalent), even though not structurally equivalent to the disclosed structure which performs the function in the herein illustrated exemplary implementations of invention.

The invention claimed is:

1. A method for determining a precoding matrix for a multi-input multi-output (MIMO) transmitter based on a weighted minimum mean square error (MMSE) algorithm, the method comprising:
   identically transforming a first matrix expression into a second matrix expression using a processor circuit, wherein the first matrix expression comprises a matrix inversion operation of a quadratic matrix having a rank equal to a number of antennas of the MIMO transmitter and the second matrix expression comprises a matrix inversion operation of a quadratic matrix having a rank equal to a number of receivers scheduled for the MIMO transmitter, wherein the number of antennas of the MIMO transmitter is greater than the number of receivers scheduled for the MIMO transmitter; and
   precoding a data stream for transmission using a precoding matrix according to the second matrix expression, wherein the precoded data stream comprises MIMO transmitter signals.

2. The method of claim 1, wherein identically transforming the first matrix expression is based on a Woodbury matrix identity formula.

3. The method of claim 1, wherein the second matrix expression further comprises a diagonal matrix of a rank equal to a number of antennas of the MIMO transmitter.

4. The method of claim 1, further comprising transmitting the MIMO transmitter signals to the scheduled receivers based on the determined precoding matrix.

5. The method of claim 1, wherein the weighted MMSE algorithm comprises an optimization based on a sum-rate utility function.

6. The method of claim 1, wherein the weighted MMSE algorithm comprises a singular value decomposition of a quadratic matrix having a rank equal to the number of receivers scheduled for the MIMO transmitter.

7. The method of claim 1, wherein the quadratic matrix having a rank equal to a number of antennas of the MIMO transmitter comprises a Lagrange multiplier.

8. The method of claim 1, wherein the quadratic matrix having a rank equal to a number of antennas of the MIMO transmitter comprises a sum of channel information related to the different receivers.

9. The method of claim 8, wherein the channel information is based on channel reciprocity of an uplink and a downlink transmission.

10. A device for determining a precoding matrix for a MIMO transmitter based on a weighted MMSE algorithm, the device comprising:
    a memory configured to store instructions for the weighted MMSE algorithm comprising an identity transformation algorithm; and
    a precoding circuit comprising a processor configured to execute the instructions stored in the memory to identically transform a matrix inversion operation of a quadratic matrix having a rank equal to a number of antennas of the MIMO transmitter into a matrix inversion operation of a quadratic matrix having a rank equal to a number of receivers scheduled for the MIMO transmitter, wherein the number of antennas of the MIMO transmitter is greater than the number of receivers scheduled for the MIMO transmitter.

11. The device of claim 10, further comprising a Woodbury module configured to identically transform the matrix inversion operation based on a Woodbury matrix identity formula.

12. The device of claim 10, wherein the device is comprised in a base station of a cellular communication system.

13. The device of claim 12, wherein the cellular communication system is a Time Division Duplex (TDD) system.

14. A method of determining a precoding matrix for a multi-user (MU) multi-input multi-output (MIMO) transmitter based on a weighted minimum mean square error (MMSE) algorithm, the method comprising:
    determining a number of scheduled receivers;
    starting an iterative process of the MMSE algorithm taking into account all scheduled receivers;
    determining during the iterative process a user rate change for each of the scheduled receivers;
    selecting effective receivers from the scheduled receivers based on the determined user rate change; and
    determining the precoding matrix only for the effective receivers.

15. The method of claim 14, further comprising transmitting by the MU-MIMO transmitter signals to the effective receivers based on the determined precoding matrix.

16. The method of claim 14, further comprising:
during determining the precoding matrix identically transforming a first matrix expression into a second matrix expression, wherein the first matrix expression comprises a matrix inversion operation of a quadratic matrix having a rank equal to a number of antennas of the MIMO transmitter and the second matrix expression comprises a matrix inversion operation of a quadratic matrix having a rank equal to a number of the effective receivers.

17. A device for determining a precoding matrix for a multi-user multi-input multi-output (MU-MIMO) transmitter based on a weighted minimum mean square error (MMSE) algorithm, the device comprising a precoding circuit configured to:
determine a number of receivers scheduled for the MU-MIMO transmitter;
start an iterative process of the MMSE algorithm taking into account all scheduled receivers;
determine during the iterative process a user rate change for each of the scheduled receivers;
select effective receivers from the scheduled receivers based on the determined user rate change; and
determine the precoding matrix only for effective receivers.

18. The device of claim 17, wherein the precoding circuit further comprising:
a processor configured to perform the iterative process; and
a memory configured to store instructions for the weighted MMSE algorithm comprising a selection algorithm.

19. The device of claim 17, the precoding circuit further configured to identically transform a matrix inversion operation of a quadratic matrix having a rank equal to a number of antennas of the MIMO transmitter into a matrix inversion operation of a quadratic matrix having a rank equal to a number of receivers scheduled for the MIMO transmitter.

* * * * *